United States Patent [19]

Rizk et al.

[11] Patent Number: 4,653,723

[45] Date of Patent: Mar. 31, 1987

[54] CONTROL VALVE FOR A FUEL INJECTOR

[75] Inventors: Reda Rizk, Cologne; Hans-Gottfried Michels, Erftstadt, both of Fed. Rep. of Germany

[73] Assignee: Klöckner-Humboldt-Deutz Aktiengesellschaft, Cologne, Fed. Rep. of Germany

[21] Appl. No.: 758,170

[22] Filed: Jul. 23, 1985

[30] Foreign Application Priority Data

Jul. 25, 1984 [DE] Fed. Rep. of Germany ....... 3427421

[51] Int. Cl.[4] ............................................. F16K 39/00

[52] U.S. Cl. .................................. 251/282; 251/324; 123/458

[58] Field of Search ........... 251/282, 324, 359, 129.07; 137/561 R, 861; 123/458, 467, 506

[56] References Cited

U.S. PATENT DOCUMENTS

| | | | |
|---|---|---|---|
| 1,743,758 | 1/1930 | Cobb | 251/324 |
| 3,122,154 | 2/1964 | Siebel et al. | 251/282 |
| 3,356,333 | 12/1967 | Scaramucci | 251/359 |
| 3,680,832 | 8/1972 | Uliczky | 251/282 |
| 3,887,162 | 6/1975 | Antoni et al. | 251/129.07 |
| 4,273,091 | 6/1981 | Stumpp et al. | 123/506 |

FOREIGN PATENT DOCUMENTS 3002361 7/1980 Fed. Rep. of Germany .

*Primary Examiner*—Martin P. Schwadron
*Assistant Examiner*—Sheri M. Novack
*Attorney, Agent, or Firm*—Becker & Becker, Inc.

[57] ABSTRACT

A control valve for a fuel injector, especially of an air-compressing, spontaneous-ignition, internal combustion engine. The control valve includes a valve body in the form of a piston valve which is axially movable in a housing chamber into a closure position and an open position, with the closure position being determined by a valve seat on the housing, and a seating surface edge on the piston valve. The housing chamber includes at least one high pressure connection, and a low pressure connection. The basic problem with a control valve of this general type is that when the piston valve strikes the valve seat, rebound movements are carried out by the piston valve, so that the closure position can only be reliably assumed after a certain time delay, thus negatively influencing the injection process. In order to avoid these drawbacks, it is possible to have the valve housing chamber, either between its valve seat and the high pressure connection on the one hand, as well as the high-pressure side of the piston valve adjacent the seating surface edge on the other hand, or between its valve seat and the low pressure connection on the one hand as well as the low-pressure side of the piston valve adjacent the seating surface edge, each be provided with a portion having the same diameter. Alternatively, an attenuation mass, especially an attenuation piston element, can be provided on and/or within the piston valve, with this attenuation mass being movable relative to the piston valve.

9 Claims, 2 Drawing Figures

CONTROL VALVE FOR A FUEL INJECTOR

BACKGROUND OF THE INVENTION

1. Field of the Invention

The present invention relates to a control valve for a fuel injector, especially an electromagnetically actuated control valve for a fuel injector of an air-compressing, spontaneous-ignition, internal combustion engine; the control valve includes a housing and a valve body in the form of a piston valve which is axially movable in a housing chamber into a closure position and an open position, with the closure position being determined by a valve seat on the housing, and a seating surface edge on the piston valve; the housing chamber includes at least one high pressure connection, and a low pressure connection.

2. Description of the Prior Art

A control valve of this general type for a fuel injector is known from German Offenlegungsschrift No. 30 02 361. On the one hand, this heretoforeknown control valve controls the injection times (start and finish of injection) by controlling the intake channel of an injection pump, and on the other hand connects a discharge channel with a high pressure channel of the injection pump. The control valve itself is provided with a valve body which is in the form of a piston valve and is provided with a valve seat, with a high pressure chamber (high-pressure side of the piston valve) and a low pressure chamber (low-pressure side of the piston valve) respectively being provided on the two sides of the valve seat. The oppositely disposed pressure attack surfaces of the high pressure and low pressure chambers have different dimensions. Furthermore, a fixed throttle is provided in the discharge channel so that an exact closure position of the piston valve can be assumed without oppositely directed opening movements. For this purpose, an overall considerable manufacturing and assembly cost is required.

However, results show that significant drawbacks are connected with the control valves of the aforementioned type, so that despite the expense of these valves, a precise regulation of the injection process is not possible; furthermore, the operating conditions of the internal combustion engine are altered in a disadvantageous manner. This is based particularly on the fact that during impact of the seating surface edge of the piston valve in the valve seat of the valve housing, unavoidable rebound movements occur. Tolerances with regard to the material, manufacturing, and prestressing of the springs required for the closure process make varying rebound movements unavoidable for multi-cylinder internal combustion engines, for example with the control valves provided per cylinder unit. As a result, there is a distinct lack of uniform conveyance of fuel for the respective cylinder units as a result of the function-related drawbacks of the heretofore known control valves. Furthermore, different rebound movements of the various control valves cause different leakage or lack of sealing in the valve seat. A further drawback of the heretofore known control valves is that the throttled discharge opposes a rapid pressure reduction at the end of injection in the sense of a favorable consumption and emission characteristic of the internal combustion engine; furthermore a fixed value throttling cannot satisfy various operating points of the internal combustion engine due to different closing off at any given time.

An object of the present invention is to provide a control valve for a fuel injector of the aforementioned general type which, while including the material and manufacturing tolerances for which allowance must necessarily be made, while at the same time not adversely affecting the uniform conveyance, and while providing nearly uniform sealing conditions, is in the position to be used in fuel injectors of multi-cylinder internal combustion engines.

This object, and other objects and advantages of the present invention, will appear more clearly from the following specification in conjunction with the accompanying drawings.

SUMMARY OF THE INVENTION

Figure 1:
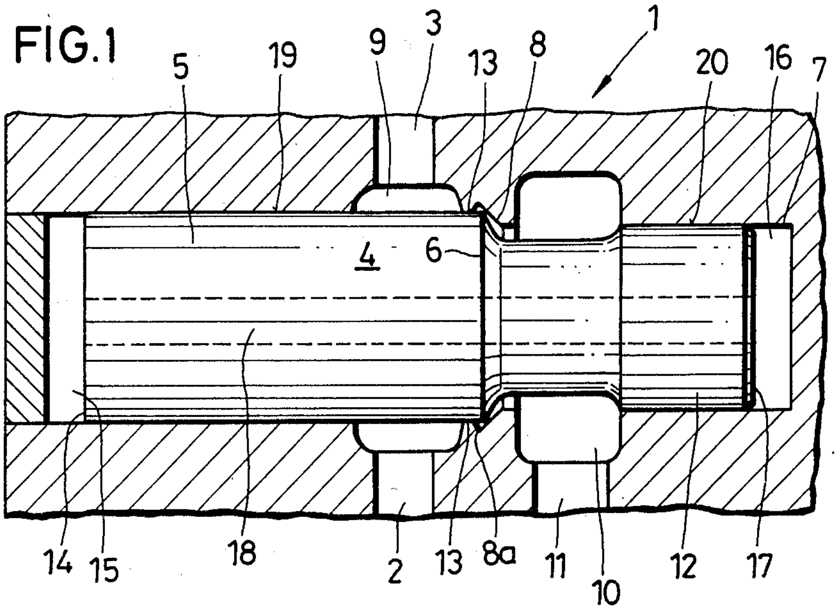
FIG. 1 is a schematic cross-sectional illustration of a first embodiment of the inventive control valve.

The control valve of the present invention is characterized primarily in that the valve housing chamber, either between its valve seat and the high pressure connection on the one hand, as well as the high pressure piston valve region adjoining the seating surface edge on the other hand, or between its valve seat and the low pressure connection on the one hand as well as the low-pressure side of the piston valve adjoining the seating surface edge on the other hand, are each provided with a portion having the same diameter.

The essential advantage of this inventive approach consists in that the piston valve, during its closure movement, already cuts off the connection between the high pressure connection and the low pressure connection when the seating surface edge of the piston valve reaches the valve housing portion which has the same diameter. This occurs before the seating surface edge of the piston valve impacts the valve seat of the valve housing chamber. Possible rebound movements of the piston valve resulting from the impact movement against the valve seat thus have no influence upon the effective closure position of the control valve. Consequently, varying rebound movements during the closure process can also not negatively affect the sealing condition and hence the injection process. To the extent that such an inventive control valve is utilized in a fuel injector for multi-cylinder internal combustion engine, a uniform conveyance of fuel to the individual cylinder units is thus assured by the respective control valves while also including material, manufacturing, or prestressing tolerances of the springs which are possibly used for actuating the piston valve.

The sealing overlapping region between the piston valve and the valve housing chamber is preferably provided on the high-pressure side of the piston valve. Pursuant to one inventive embodiment, the high-pressure side of the piston valve has a constant diameter which equals the diameter of the seating surface edge, and the valve housing chamber has a portion between its valve seat and the high pressure connection which has the same diameter as does the high-pressure side of the piston valve. This inventive embodiment has the considerable advantage that non-uniform pressure distributions on the piston valve can, due to the fact that no pressure attack surfaces exist, not exert any disturbing influences on the high-pressure side of the piston valve either in the closure position or during the opening phase of the piston valve, so that taken as a whole an absolutely stable condition of the piston valve is assured in all operating regions. Furthermore, this inventive configuration considerably reduces the manufacturing costs for the control valve. With regard to the closure position of the piston valve, the valve seat on the housing side is embodied in such a way that it overlaps the piston valve by means of an undercut. This assures that the space necessary for a respectively required machining of the valve seat is provided.

Taken as a whole, the low-pressure side of the piston valve is preferably provided with a smaller diameter than is the high-pressure side of the piston valve. This assures that in the high pressure phase, during an injection process, there is basically provided a resulting pressure in the closure direction. This includes the advantage of an absolute sealing of the control valve in the high pressure phase. This advantage is critical for the operating results, especially with air-compressing, spontaneous-ignition, internal combustion engines which require very high injection pressures of 1000 to 2000 bar.

The control valve of the present invention can also be characterized in that on and/or within the piston valve there is provided an attenuation mass, in particular an attenuation piston element, which is movable relative to the piston valve. In an advantageous manner, this attenuation mass counteracts possible rebound movements of the piston valve after the latter impacts the valve seat, so that rebound movements are extensively eliminated. Thus, this inventive approach also assures that such an inventive control valve can be utilized in a fuel injector for multi-cylinder internal combustion engines while accomplishing the desired advantages. Of course, in place of the attenuation piston element, the attenuation mass can also have other forms, such as one or more spheres, or even by a fluid filled into a hollow space provided within the piston valve.

However, the attenuation mass is preferably embodied as an attenuation piston which has an essentially tubular cross-sectional structure and is axially movable in a receiving chamber provided within the piston. The attenuation piston can be held within the receiving chamber by means of an abutment element attached to the piston valve. This abutment element can be embodied in such a way, i.e. can be attached to the piston valve in such a way, that the receiving chamber has a greater longitudinal dimension than does the attenuation piston. In other words, when the attenuation piston is installed, a gap exists in the axial direction of the piston valve between the end face region of the attenuation piston and the abutment surface of the abutment element. This gap, i.e. the different longitudinal dimension of the receiving chamber and of the attenuation piston, thereby determines the time delay with which the attenuation piston, after the piston valve has impacted the valve seat, generates the closure force which counteracts the rebound movement of the piston valve; this closure force is generated when the attenuation piston impacts that end face of the receiving chamber opposite the abutment element. For ease of production, the abutment element is preferably screwed into the end face of the high-pressure side of the piston valve. Just like the attenuation piston, the abutment element is preferably essentially hollow cylindrical.

Pursuant to further specific features of the present invention, the valve housing chamber may be provided with a chamber on the high-pressure side and a chamber on the low-pressure side, with respective ones of the end faces of the piston valve being associated with respective ones of these chambers. Beyond the high pressure and low pressure connections thereof, the housing chamber may be sealed in a pressure-tight manner.

The high and low pressure chambers of the housing chamber may be connected by at least one bore provided in the piston valve. This bore may extend through the attenuation piston and/or the abutment element.

These further advantageous embodiments of the inventive control valve or valves are particularly instrumental in providing a considerable improvement of the control valve with regard to, for example, low piston actuation forces, optimization of possible disruptive influences on the control valve as a result of, for example, non-uniform pressure or pressure differences in the pressure equalization lines, and the preparation of a closure pressure which acts upon the piston valve.

DESCRIPTION OF PREFERRED EMBODIMENTS

Figure 2:
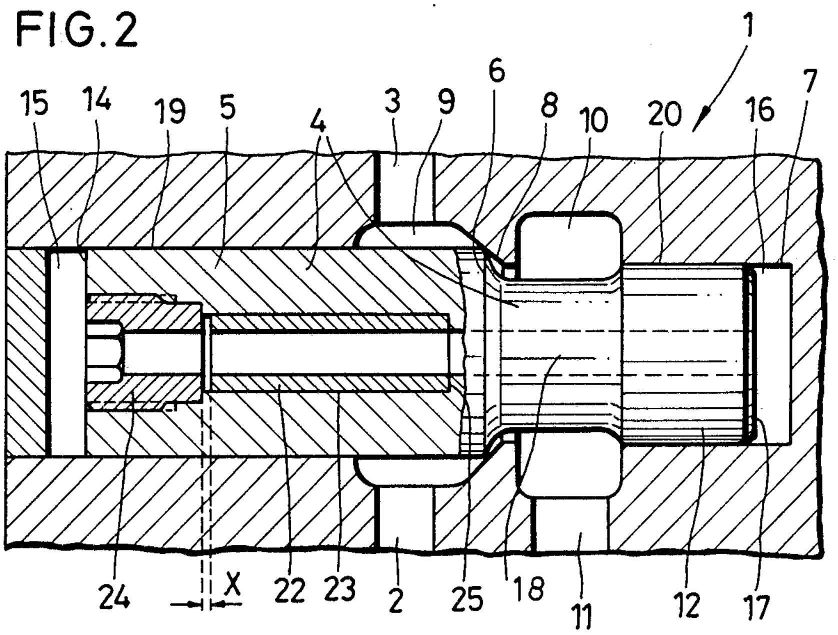
FIG. 2 is a schematic cross-sectional illustration of a second embodiment of the inventive control valve.

Referring now to the drawing in detail, FIGS. 1 and 2 are detailed views of inventive embodiments of control valves 1; parts which operate in basically the same way are designated with the same reference numerals. These control valves 1 are intended for use in a fuel injector of a multi-cylinder, spontaneous-ignition, internal combustion engine. Although not illustrated in detail, the inventive control valves are associated with a fuel injection pump which, as is generally customary, comprises a pump housing, and a pump element which is embodied as a pump piston and is driven and movable in a pump chamber in a known manner via a cam and a spring-loaded push rod. The control valves 1 communicate via the high pressure connecting channel 2 with the non-illustrated fuel injection pump. The high pressure channel 3 leads to a non-illustrated fuel injection nozzle.

The high pressure connecting channel 2 and the high pressure channel 3 which leads to the fuel injection nozzle are controlled by a valve body 4 which is embodied as a piston valve; the high-pressure side 5 of the piston valve 4 is delimited by a seating surface edge 6. The seating surface edge 6 cooperates with a valve seat 8 formed in the valve housing chamber 7 and assures, in the closure position of the piston valve 4, the high pressure connection between the high pressure connecting channel 2 and the high pressure channel 3 which leads to the fuel injection nozzle. Provided on the high-pressure side in the valve housing chamber 7 is a high pressure chamber 9, and provided on the low-pressure side is a low pressure chamber 10; a discharge channel 11 leads from the latter to a non-illustrated fuel tank. For the basic functioning of the control valve 1, in the open position of the control valve 1 the high pressure connecting channel 2 can be connected via the valve body 4 with the discharge channel 11 which leads to the fuel tank, so that the beginning and ending of injection can be regulated in the high pressure phase of the fuel injection pump by opening or closing the valve body 4.

To facilitate illustration, the actuating elements of the control valve were not shown in the drawing. However, it is basically noted that the piston valve is preferably acted upon by a compression spring and is operated by an electromagnetic adjusting device which is controlled by an electrically operating data processor. In so doing, the electromagnetic adjusting device preferably engages the end face of the low-pressure side 12 of the piston valve, with a compression spring acting upon the end face of the high-pressure side 5 of the piston valve. These actuating elements of the piston valve are preferably similar to the actuating elements described in the copending U.S. patent application Ser. No. 573,803 Wallenfang et al, filed Jan. 25, 1984 and belonging to the assignee of the present application. This copending application is hereby incorporated into this application by this reference thereto.

In the embodiment of the control valve illustrated in FIG. 1, the movement range of the piston valve 4 is provided in the region of the high-pressure side of the valve housing chamber 7. Consequently, the valve housing chamber 7 of the inventive control valve of FIG. 1 has a portion 13 between the valve seat 8 and the high pressure connecting channel 2 and the high pressure channel 3; this portion 13 has the same diameter as does the entire high-pressure side 5 of the piston valve. The diameter of the valve housing portion 13 naturally has such a tolerance on fit that the axial movement of the piston valve 4 is not adversely affected.

In the open position, the end face 14 of the high-pressure side 5 of the piston valve rests extensively against the end face of the housing chamber 15 which is disposed on the high-pressure side. As soon as the piston valve moves out of the open position in the direction toward the valve seat, the seating surface edge 6 passes over the portion 13 before it impacts the valve seat 8 of the valve housing chamber 7, thereby severing the connection between the high pressure chamber 9 and the low pressure chamber 10. To the extent that after the seating surface edge 6 has impacted the valve seat 8 the piston valve 4 executes possible rebound movements, the latter have no effect upon the sealing condition of the control valve 1, so that the high pressure connection between the high pressure connecting channel 2 and the high pressure channel 3 to the injection nozzle is constantly assured. When the inventive control valve is used in a fuel injector of multi-cylinder internal combustion engines, fuel is uniformly conveyed with assurance to each of the cylinder units.

In the embodiments of FIGS. 1 and 2, the low-pressure side 12 of the valve body has an overall smaller diameter than does the high-pressure side 5 of the piston valve. Furthermore, the valve housing chamber 7 has a housing chamber 15 on the high-pressure side and a housing chamber 16 on the low-pressure side, with the end face 14 being associated with the high-pressure side and the end face 17 being associated with the low-pressure side. The housing chamber 15 on the high-pressure side and the housing chamber 16 on the low-pressure side are connected with one another via a bore 18 which extends within the piston valve 4. These features of the inventive control valve are the basis for further important advantages. Since the high-pressure side 15 of the piston valve is embodied with a smooth transition into the seating surface edge 6, no pressure attack surfaces whatsoever are formed for the very high fuel pressure, so that possible non-uniform pressure distribution can exert no influence upon the piston valve 4 in the closure position, which is critical for the regulatable injection process. During the high pressure phase of the fuel injection pump, the fuel is conveyed to the non-illustrated fuel injection nozzle via the high pressure channel 3, the high pressure chamber 9, and the high pressure connecting channel 2. In so doing, a pressure drop occurs via the sealing gap 19 in the high-pressure side 5 of the piston valve to the housing chamber 15 on the high-pressure side, and thus via the bore 18 also to the housing chamber 16 on the low-pressure side; this pressure drop continuously assures that the chamber system is filled with fuel. As a result of the opening movement of the piston valve 4, fuel is forced out of the housing chamber 15 on the high-pressure side into the housing chamber 16 on the low-pressure side, whereby due to the difference in diameters of the end faces 14 and 17 of the piston valve 4, the fuel is compressed in the housing chambers. In the open position of the piston valve 4, this high pressure is reduced by the fact that the fuel flows off through the sealing gap 20 on the low-pressure side. This quantity of fuel which has flowed out is again replenished in the closure position of the piston valve 4 due to the pressure drop via the sealing gap 19 on the high-pressure side, whereby the filling process, during the high pressure phase, exerts upon the piston valve 4 a further resulting closure force which enhances the sealing of the control valve 1, so that in addition to the already mentioned advantages with regard to the rebound movements, an absolute sealing of the control valve in the closure position is advantageously optimized.

With regard to the basic construction, the embodiment of FIG. 2 is analogous to that of the embodiment of FIG. 1. Thus, the aforementioned detailed advantages are also fully applicable to the embodiment of FIG. 2. Provided within the piston valve 4 of the embodiment of FIG. 2 is an attenuation mass which is moveable relative to the piston valve 4. This attenuation mass is embodied as the attenuation piston element 22, which has a tubular cross-sectional structure and is disposed in a receiving chamber 23 in such a way that it is movable in the axial direction of the piston valve 4. The receiving chamber 23 has a greater axial dimension than does the attenuation piston element 22. In the direction of the end face 14 of the high-pressure side 5, this receiving chamber 23, i.e. the axial mobility of the attenuation piston element 22, is delimited by an abutment element 24 which can be screwed into the end face 14. As a result of the greater longitudinal dimension of the receiving chamber 23, a gap "x" is formed. During acceleration of the piston valve out of the open position in the direction toward the valve seat 8, the attenuation piston rests against the abutment element 24 due to the differences in inertia. As the seating surface edge 6 of the piston valve strikes the valve seat 8, the attenuation piston 22, with a delay which is predetermined by the gap "x" and thus by the dimensions of the attenuation piston 22 and the receiving chamber 23, moves toward that end face 25 of the receiving chamber 23 which faces the seating surface edge 6. When the attenuation piston element 22 strikes the end face 25, there results a force which counteracts possible rebound movements of the piston valve, so that such rebound movements of the piston valve are eliminated to a large extent. Due to the tubular cross-sectional structure of the attenuation piston element 22, and the hollow-cylindrical construction of the abutment element 24, the flow connection between the housing chamber 15 on the high-pressure side and the housing chamber 16 on the low-pressure side is established in a structurally simple manner.

The present invention is, of course, in no way restricted to the specific disclosure of the specification and drawing, but also encompasses any modifications within the scope of the appended claims.

What we claim is:

1. A control valve for a fuel injector, including an electromagnetically actuated control valve for a fuel injector of an air-compressing, spontaneous-ignition, internal combustion engine; said control valve including a housing, and a valve body in the form of a piston valve which is axially movable in a housing chamber into a closure position and into an open position respectively, with said closure position being determined by a valve seat on said housing, and by a seating surface edge on said piston valve; said housing chamber including at least one high pressure connection, and a low pressure connection; the improvement in combination therewith wherein:

said piston valve is provided with an attenuation means in the form of an attenuation means for reciprocal action and mutual effect between sad piston valve and said attenuation mass which is with said piston valve and which is necessarily in direct contact with said piston valve as well as movable axially relative to said piston valve.

2. A control valve for a fuel injector, including an electromagnetically actuated control valve for a fuel injector of an air-compressing, spontaneous-ignition, internal combustion engine; the control valve includes a housing, and a valve body in the form of a piston valve which is axially movable in a housing chamber into a closure position and an open position, with said closure position being determined by a valve seat on said housing, and by a seating surface edge on said piston valve; said housing chamber includes at least one high pressure connection, and a low pressure connection; the improvement wherein:

said piston valve is provided with an attenuation mass which is movable relative to said piston valve; and a receiving chamber provided within said piston valve, said attenuation mass being in the form of an attenuation piston having an essentially tubular cross-sectional structure; said attenuation piston being axially movable within said receiving chamber of said piston valve.

3. A control valve according to claim 2, which includes an abutment element which is secured to said piston valve for holding said attenuation piston within said receiving chamber.

4. A control valve according to claim 3, in which said abutment element is embodied, and is secured to said piston valve so that said receiving chamber has a greater longitudinal dimension than does said attenuation piston.

5. A control valve according to claim 3, in which said piston valve has a high-pressure side with an end face into which said abutment element is screwed 6. A control valve according to claim 3, in which said abutment element is essentially hollow cylindrical.

7. A control valve according to claim 3, in which said housing chamber has a high pressure chamber and a low pressure chamber; and in which said piston valve is provided with at least one bore therein to interconnect said pressure chambers of said housing chamber.

8. A control valve according to claim 7, in which said at least one bore in said piston valve also extends through at least one of said attenuation piston and said abutment element.

9. A control valve according to claim 3, in which said piston valve has a high-pressure side on which said seating surface edge is disposed, with said high-pressure side having a constant diameter which equals the diameter of said seating surface edge; and in which said piston valve has a low-pressure side which has a diameter that is less than the diameter of said high-pressure side thereof.

* * * * *